(12) United States Patent
Saito et al.

(10) Patent No.: US 6,523,274 B1
(45) Date of Patent: Feb. 25, 2003

(54) UNIT ASSEMBLING ERROR PREVENTION STRUCTURE

(75) Inventors: Satoshi Saito, Shizuoka (JP); Tomohiro Ikeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/587,517

(22) Filed: Jun. 5, 2000

(30) Foreign Application Priority Data

Jun. 4, 1999  (JP) ............................................. 11-157538

(51) Int. Cl.$^7$ .......................... G01D 21/00; G01B 3/14; H01M 2/00
(52) U.S. Cl. .......................... 33/562; 33/600; 429/100; 180/68.5
(58) Field of Search .......................... 33/600, 613, 562, 33/645, 533; 180/65.1, 68.5

(56) References Cited

U.S. PATENT DOCUMENTS

| | | | | |
|---|---|---|---|---|
| 4,317,497 A | * | 3/1982 | Alt et al. .................... | 180/68.5 |
| 5,484,667 A | * | 1/1996 | Sahli et al. ................. | 180/68.5 |
| 5,536,595 A | * | 7/1996 | Inkmann et al. ........... | 180/68.5 |
| 5,795,193 A | * | 8/1998 | Yang .......................... | 439/621 |
| 6,224,998 B1 | * | 5/2001 | Brouns et al. .............. | 429/100 |
| 6,261,719 B1 | * | 7/2001 | Ikeda et al. ................. | 429/211 |
| 6,290,552 B1 | * | 9/2001 | Saito et al. ................. | 439/736 |

\* cited by examiner

*Primary Examiner*—Diego Gutierrez
*Assistant Examiner*—Yaritza Guadalupe
(74) *Attorney, Agent, or Firm*—Armstrong, Westerman & Hattori LLP

(57) ABSTRACT

A unit assembling error prevention structure consists of a first unit, a second unit, a plurality of fixing means arranged at equal pitches, with which to assemble the first and second units together, two types of positioning frames, large and small, provided in an alternate manner on one of the first and second units, and a projection means provided on the other of the first and second units. The projection means is capable of advancing into the large positioning frame, but abuts against the small positioning frame. A pitch discrepancy is prevented at the time of assembling a battery connection plate or the like to a battery assembly or the like.

6 Claims, 7 Drawing Sheets

UNIT ASSEMBLING ERROR PREVENTION STRUCTURE

BACKGROUND OF THE INVENTION

1. Field of the Invention

This invention relates to a unit assembling error prevention structure for preventing a pitch discrepancy when assembling, for example, a battery connection plate, a unit to be assembled to a battery assembly of an electric vehicle.

2. Description of the Related Art

FIG. 5 shows a first example of a conventional unit assembling structure.

This structure fixes a unit of an elongated harness protector 50 to an outer wall 52 of a mating unit of a device 51 with small screws (fixing means) 53. The device 51 is installed, for example, on a vehicle and connected to a power source (not shown) through a wiring harness 54 inside the harness protector 50.

The harness protector 50 is made of synthetic resin into rectangular trough-like shape and is provided at both sides of its trough-like portion 55 with a plurality of brackets 56 disposed at equal pitches. The wiring harness 54 is received inside the trough-like portion 55 and fixed therein with a wound vinyl tape 57. Each bracket 56 is fixed to the outer wall 52 of the device 51 with the small screws 53.

The wiring harness 54 has a plurality of branch lines 58 which extend at substantially equal pitches from an intermediate portion of the harness protector 50, and a connector 59 at the tip end of each branch line 58 is fitted and connects to a connector (not shown) situated on the outer wall 52 of the device 51. The main line of the wiring harness 54 extends out at both ends of the harness protector 50 and is led inside the device 51 through apertures 60 formed in the outer wall 52.

With the above construction, however, when to install the harness protector 50 on the device outer wall 52, an operator, during fixation of the brackets 56 to the outer wall 52, may accidentally have the holes (not shown) of the brackets 56 misaligned or mismatched by one pitch in the longitudinal direction of the harness protector 50 with the threaded holes (not shown) of the outer wall 52. Consequently, a false connection is made between the branch line connectors 59 and the device 51 side connectors.

FIG. 6 shows a second example of a conventional unit assembling structure.

This structure fixes and connects units, i.e., a pair of elongated battery connection plates 62, 62' to both ends of a mating unit of a battery assembly 63. The battery assembly 63 is installed on an electric vehicle inclusive of a hybrid car, and the battery connection plates 62, 62' connect the batteries 65 ($65_1$, $65_2$ ...) of the battery assembly 63 in series through a plurality of busbars 70 ($70_1$, $70_2$ ...) thereof of conductive metal.

The batteries 65, each having a thin rectangular parallelepiped shape, are joined in a width direction thereof and fixed one another with a band 66. Each battery 65 has at its longitudinal ends a positive and negative electrodes 67 ($67_1$, $67_2$ ...) or externally threaded terminals (fixing means) such that positive and negative electrodes 67 are arranged in an alternating manner at equal pitches P in the joining direction of the batteries 65.

Each battery connection plate 62, 62' consists of a plate body 68 of synthetic resin which is substantially the same in length as the entire width of the battery assembly 63, a busbar 70 disposed in a plurality of rectangular grooves 69 formed on the plate body 68, and a cover 72 of synthetic resin rotatably provided via a hinge 71 to the plate body 68.

The busbars 70 are disconnected and independent from one another. One of the battery connection plates 62 is provided at both ends with a substantially square busbar $70_1$ having one insertion hole $73_1$ for the electrode $67_1$ located at both left and right ends of the battery assembly 63. Each busbar $70_2$ located at a longitudinally intermediate portion of the plate body 68 is rectangular in shape and has two insertion holes $73_2$, $73_3$ for electrodes $67_2$, $67_3$ of two batteries $65_2$, $65_3$. The busbar insertion holes 73 are provided at equal pitches, corresponding to the electrodes 67. The plate body 68 has relatively large circular holes 74 arranged at equal pitches at its rear side for receiving the electrodes 67. A plurality of busbars 70, each having two insertion holes 73, are disposed in the other battery connection plate 62'.

To describe with one of the battery connection plates 62 in FIG. 6, on assembling the battery connection plate 62 to the battery assembly 63, the positive electrode 67of the battery $65_1$ at the left side end enters the insertion hole $73_1$ of the left-side end busbar $70_1$. Likewise, the negative electrode $67_2$ of the second-from-left battery $65_2$ enters one of the insertion holes $73_2$ of the second-from-left busbar $70_2$, and the positive electrode $67_3$ of the third-from-left battery $65_3$ enters the other insertion hole $73_3$ of the second-from-left busbar $70_2$, with the remaining electrodes 67 entering the insertion holes 73 of the remaining busbars 70. Each electrode 67 is tightened and connected to related busbars 70 with a nut 75. The electrodes $67_1$ ... at the left and right side ends connect through the busbars $70_1$ ... and not-shown plate terminals to a power source line (not shown).

On assembling the battery connection plate 62, a series circuit 76 as shown in FIG. 7 is constituted. Denoted 62 is the battery connection plate, 63 the battery assembly, 67 positive and negative electrodes, and 70 the busbars.

Reverting to FIG. 6, after each busbar 70 has been fastened and connected to the battery electrodes 67 with the nut 75, the cover 72 is closed to protect the busbars 70, electrodes 67, nuts 75 and the above plate terminals (not shown) in the plate body 68. The battery connection plate 62 thus also serves as a protector. The cover 72 has locking frames 77 engageable with locking projections 78 of the plate body 68 to lock the cover 72 in closed position.

With the above construction, however, there is worry that an operator, during assembling the battery connection plate 62 to the battery assembly 63, may connect the busbars 70 to the battery electrodes 67, with an inadvertent error made in aligning or matching the busbar insertion holes 73 with the battery electrodes 67 by one pitch. In this instance, as shown in FIG. 8, a closed circuit 79 as indicated by an arrow X is formed in the battery assembly 63, possibly causing a short circuit and sparks, and damages to batteries 65. In FIG. 8, denoted 62 is the battery connection plate, 67 the positive and negative electrodes, and 70 the busbars.

SUMMARY OF THE INVENTION

This invention has been accomplished to overcome the above drawbacks and an object of this invention is to provide a unit assembling error prevention structure which enables assembling a unit having fixing means at equal pitches such as a harness protector or a battery connection plate reliably to a mating unit such as a device or a battery assembly without a pitch discrepancy therebetween.

In order to attain the object, according to this invention, there is provided a unit assembling error prevention structure which comprises: a first unit; a second unit; a plurality of fixing means arranged at equal pitches, with which to assemble the first and second units together; two types of positioning frames, large and small, provided in an alternate manner on one of the first and second units; and a projection means provided on the other of the first and second units, which is capable of advancing into the large positioning frame, but abuts against the small positioning frame.

Preferably, the projection means comprises a pair of projections capable of advancing at opposite sides in the large positioning frame.

Preferably, the pair of projections each comprises walls intersecting at right angles.

Advantageously, the large positioning frame is replaced by an empty space.

Advantageously, the first unit comprises a battery connection plate, the second unit comprises a battery assembly, and the plurality of fixing means comprises electrodes of batteries constituting the battery assembly, the two types of positioning frames are provided on the battery connection plate, and the projection means is provided on every two of the batteries.

Preferably, the battery connection plate comprises a plurality of busbar receiving portions, and the two types of positioning frames, large and small, are provided on each of the busbar receiving portions.

Preferably, the plurality of busbar receiving portions are linked with resilient hinges to be movable relative to each other, and the positioning frames provided on each of the busbar receiving portions have a wall divided by a slit for each of the positioning frames and a wall opposite that wall, which is continuous for two or more of the positioning frames.

The above and other objects, features and advantages of this invention will become apparent from the following description and the appended claims, taken in conjunction with the accompanying drawings.

DESCRIPTION OF THE PREFERRED EMBODIMENT

Figure 1:
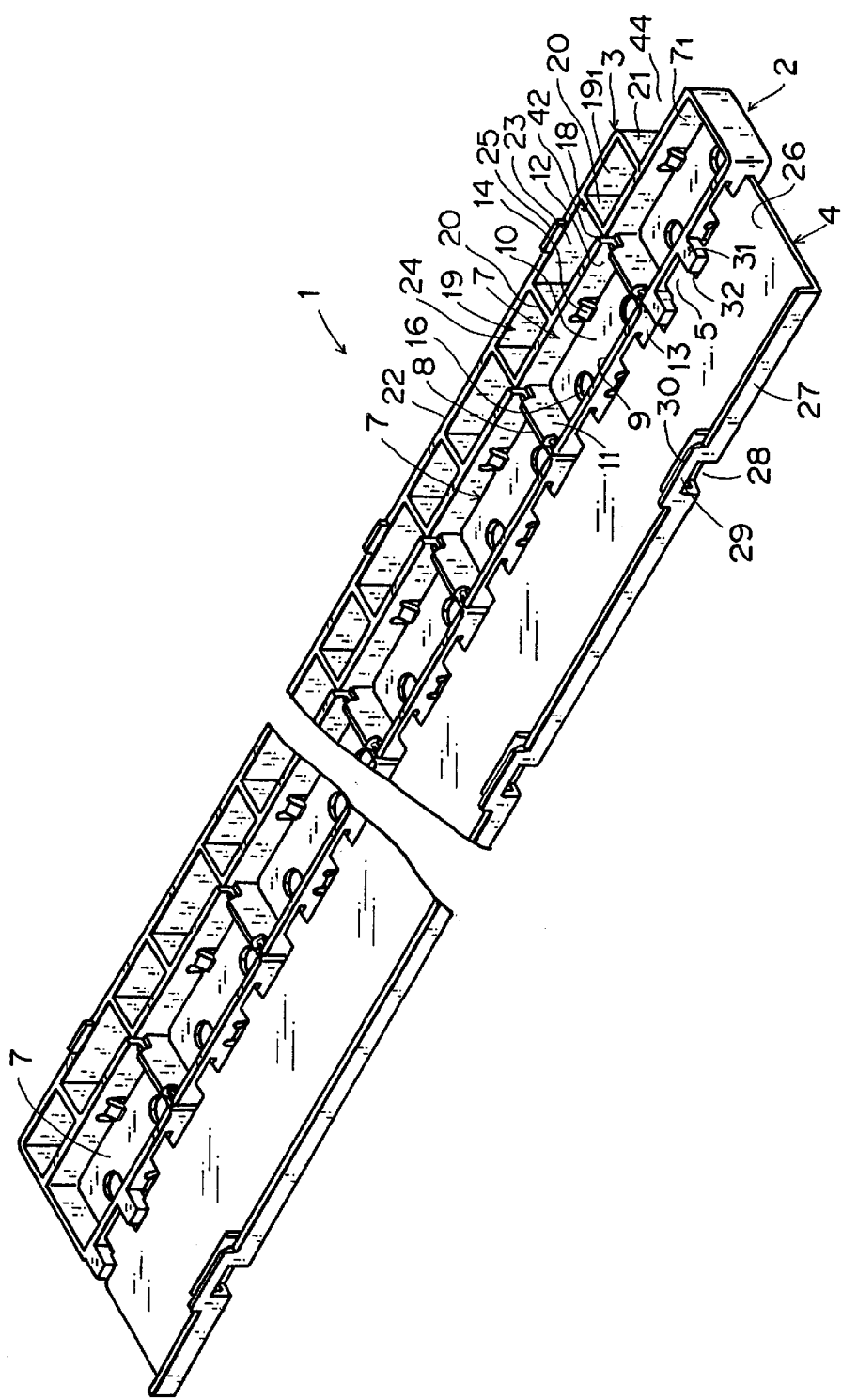
FIG. 1 is a perspective view of one example of a battery connection plate to which a unit assembling error prevention structure according to this invention is applied.

An embodiment of this invention will now be described with reference to the attached drawings.

A battery connection plate 1 includes a plate body 2 of synthetic resin, a frame-like positioning section 3 integrally provided at one end of the plate body 2, a cover 4 rotatably provided via hinges 5 at the other end of the base plate 2, and a plurality of busbars 10 disposed on the plate body 2. The integrally provided frame-like positioning section 3 features the battery connection plate 1 in this example.

The plate body 2 has busbar receiving portions 7 linked end-to-end with a resilient hinge 8 and is capable of absorbing a positional discrepancy. Such an arrangement has been proposed in another application. Each busbar receiving portion 7 is formed box-like and receives a busbar 10 on its bottom wall (not shown) though its upper opening 9. The hinge 8 is integrally formed with adjoining side walls 11 of neighboring busbar receiving portions 7.

Figure 2:
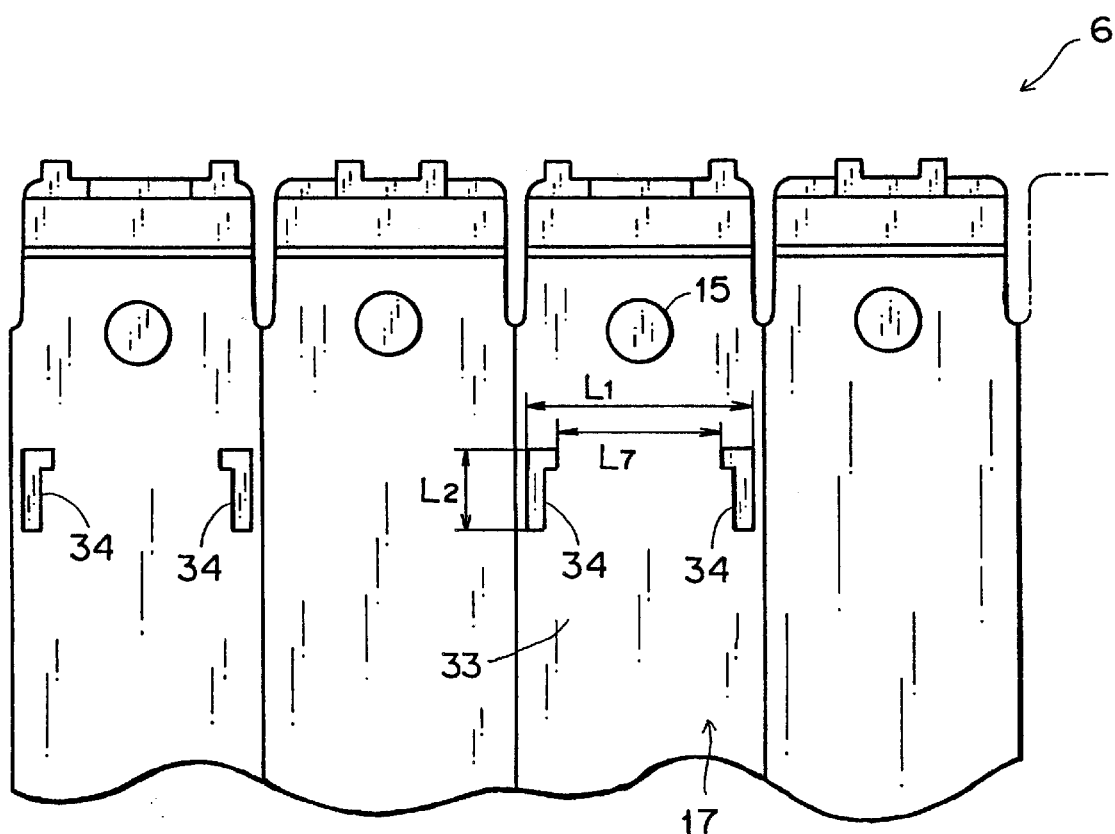
FIG. 2 is a partial plan view of a battery assembly as a mating unit.

Each busbar 10 is locked in place by resilient claws 14 provided on front and rear walls 12, 13 of busbar receiving portion 7, each of which claws is cut and raised from the wall 12, 13. Each busbar 10 is provided with two insertion holes 16 for related externally threaded electrodes 15 of the battery assembly 6 (FIG. 2). The busbars 10 used in this example have the same size and shape. The bottom wall of each busbar receiving portion 7 is provided with holes (not shown) larger than the insertion holes 16.

The battery assembly 6 (FIG. 2) is assembled to the bottom walls of the battery receiving portions 7, with the battery electrodes 15 (FIG. 2) protruding through the related insertion holes 16 into the interior of the busbar receiving portions 7, and tightened and connected to the busbars 10 with nuts (not shown).

The front and rear walls 12, 13 defining the busbar receiving portions 7 are slit in the immediate vicinity of each hinge 8 so that the busbar receiving portions 7 are movable relative to one another. At an outer side of the front wall 12 is integrally provided the frame-like positioning section 3 which is constituted by two kinds of rectangular frames 18, 19, large and small.

In this example, a large and small frames 18, 19 are juxtaposed to each busbar receiving portion 7 except for the right side end busbar $7_1$. To the right side end busbar receiving portion $7_1$ is juxtaposed only one, small frame $19_1$ at a side toward the neighbor busbar receiving portion. The large and small frames 18, 19 are alternated in the order of small and large from the right side end of the positioning section 3.

The large and small frames 18, 19 are linked to each other via a common partition wall 20 extending perpendicularly to the front wail 12 of the busbar receiving portion 7 at a position slightly displaced leftward from a longitudinal center of the busbar receiving portion 7. Each frame 18, 19 opens upwardly and downwardly and has a respective positioning space 23, 24 defined by the surrounding walls, i.e., the front wall 12 of the busbar receiving portion 7, a left and right partition walls 20 or side end wall 21, and an outer (foremost) wall 22. The outer wall 22 is provided at its upper end with locking projections 25 for the cover 4, the locking projections being located at a longitudinal center of large frames 18.

The cover 4 includes a plate-like body 26, an upright wall 27 formed at one end of the body 26 and the thin-wall hinges 5 extending at the other end of the body 26. The upright wall 27 is formed with pairs of an engagement piece 29 having an engagement hole 28 for the related locking projection 25 and a guide plate 30 opposed to the engagement piece. The body 26 is formed at the other end with positioning cutouts 32 for external rectangular protuberances 31 of the plate body 2. The protuberances 31 engage in the cutouts 32 to position the cover 4 during its rotation, so that the engagement pieces 29 are accurately guided to the respective locking projections 25.

On closing the cover 4, the guide plate 30 advances along an inner surface of the outer wall 22 at large frame 18 slightly into the space 23, and the engagement piece 29 is located along and parallel to an outer surface of the outer wall 22 at large frame 18. The guide plate 30 and the engagement piece 29 hold therebetween the outer wall 22 at the large frame 18, so as to provide greater rigidity in the large frame 18 and stably maintain the large frame 18 in shape.

Referring now to FIG. 2, a battery assembly 6 has a plurality of batteries 17 joined in parallel in a width direction thereof. Each battery 17 has an external thread terminal or electrode (fixing means) 15 projecting at both longitudinal ends thereof (only one side ends are shown in FIG. 2). The batteries 15 are arranged, for example, in the order of positive, negative, positive from the left.

Figure 3:
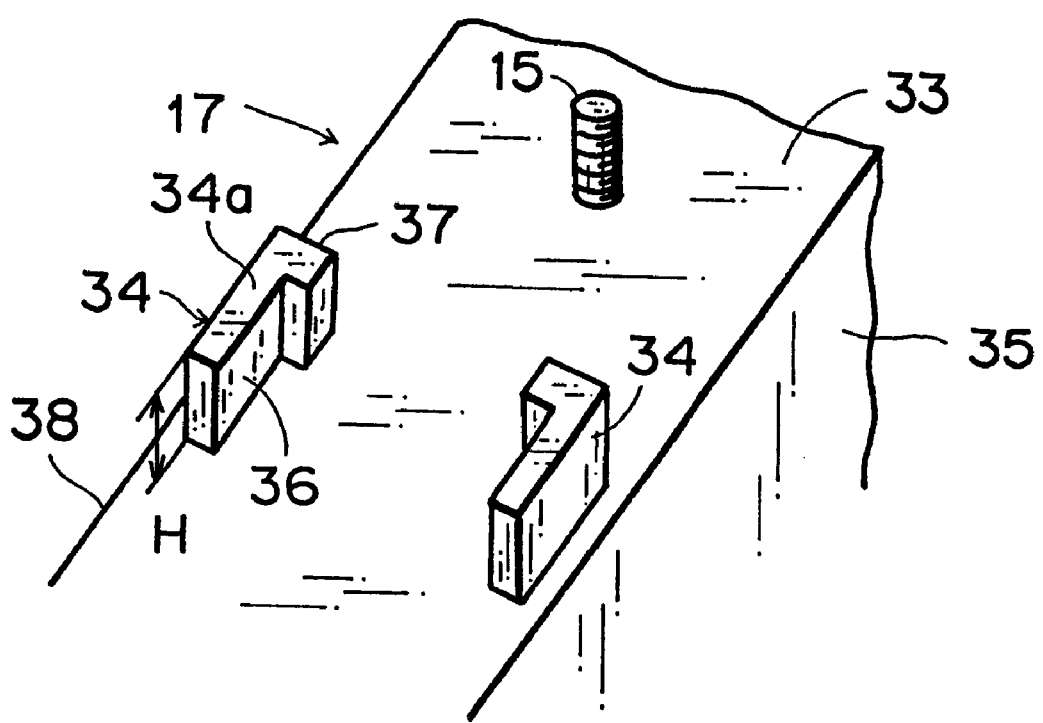
FIG. 3 is a partial perspective view of a battery in FIG. 2.

A pair of engagement projections 34 are formed on, for example, the positive-electrode side end surfaces 33 of every two batteries 17, in the vicinity of the electrodes 15, which engagement projections 34 engage in the related large frame 18 of the positioning section 3 to set the battery connection plate 1 (FIG. 1) in position on the battery assembly 6. Each projection 34, as shown also in FIG. 3, is L-shaped and includes a major wall 36 parallel to a side surface 35 of the battery 17 and a minor wall 37 extending at right angles from the major wall 36 at a side toward the electrode 15. The pair of opposed engagement projections 34 are in a symmetrical arrangement. The projections 34 are integrally molded with a battery housing 38 of synthetic resin. Alternatively, a plate member (not shown), for example, having the projections 34 may be retrofitted to the battery housing 38 or the battery assembly 6 (FIG. 2).

Figure 4:
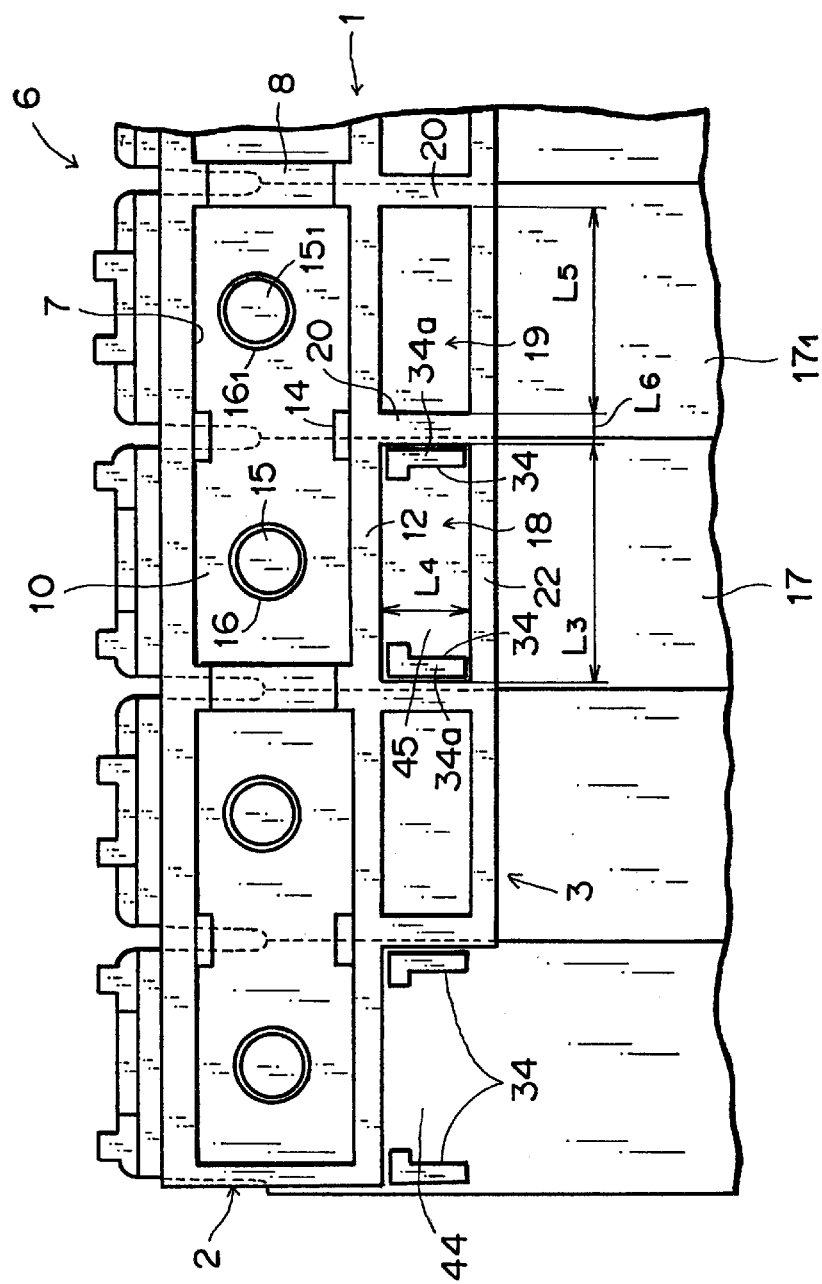
FIG. 4 is a plan view of a unit assembling error prevention structure according to this invention.
Figure 5:
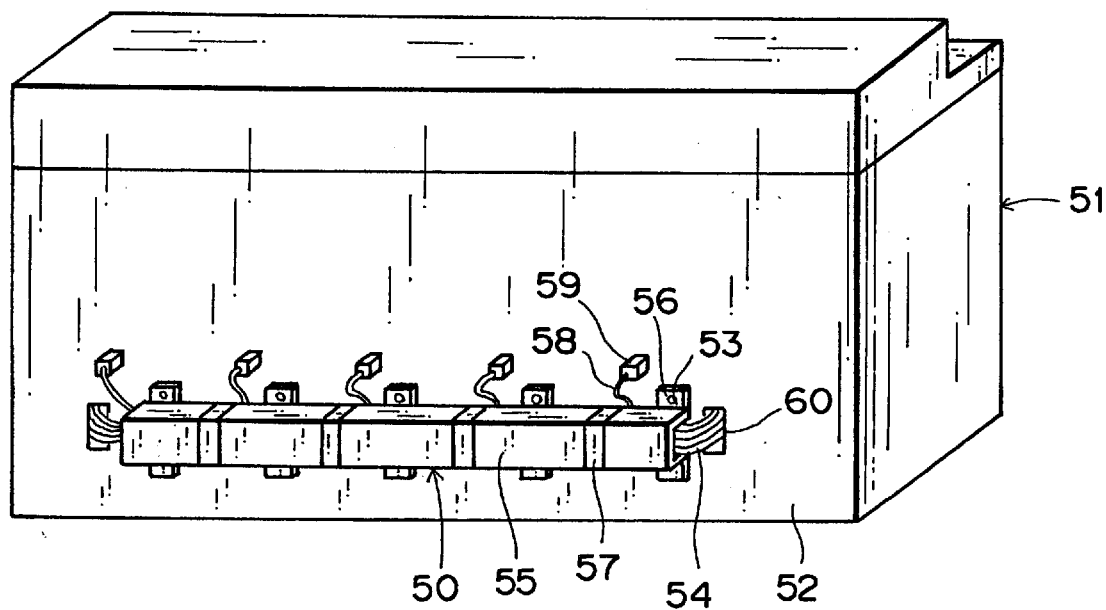
FIG. 5 is a perspective view of a first example of a conventional unit assembling structure.

In FIG. 2, the outer width dimension $L_1$ of the pair of projections 34, 34 is set slightly smaller than the longitudinal (major) inner width dimension $L_3$ (FIG. 4) of large frame 18 of the battery connection plate 1 (FIG. 4), and the length $L_2$ of the pair of projections 34 is set slightly smaller than the minor inner width dimension $L_4$ of the large frame 18 (FIG. 4). The inner width dimension $L_4$ is the same for the large and small frames 18 and 19 (FIG. 4). The pairs of projections 34, 34 have the same outer width dimension $L_1$ and the same length $L_2$. The height H (FIG. 3) of each pair of projections 34, 34 is set equal to or smaller than that of the large frame 18.

The inner width dimension $L_3$ (FIG. 4) of large frame 18 is slightly smaller than the width of battery 17, and the inner width dimension $L_5$ (FIG. 4) of small frame 19 is smaller than the inner width dimension $L_3$ of the large frame 18 substantially by the widths $L_6$ of both lateral partition walls 20. The inner width dimension $L_5$ of the small frame 19 is set smaller than the outer width dimension $L_1$ (FIG. 2) of the pair of projections 34, 34. The inner width dimension $L_5$ plus twice the width $L_6$ (FIG. 4) of the partition wall 20 is larger than the minimum inner width dimension $L_7$ (FIG. 2) of the pair of projections 34, 34.

Figure 6:
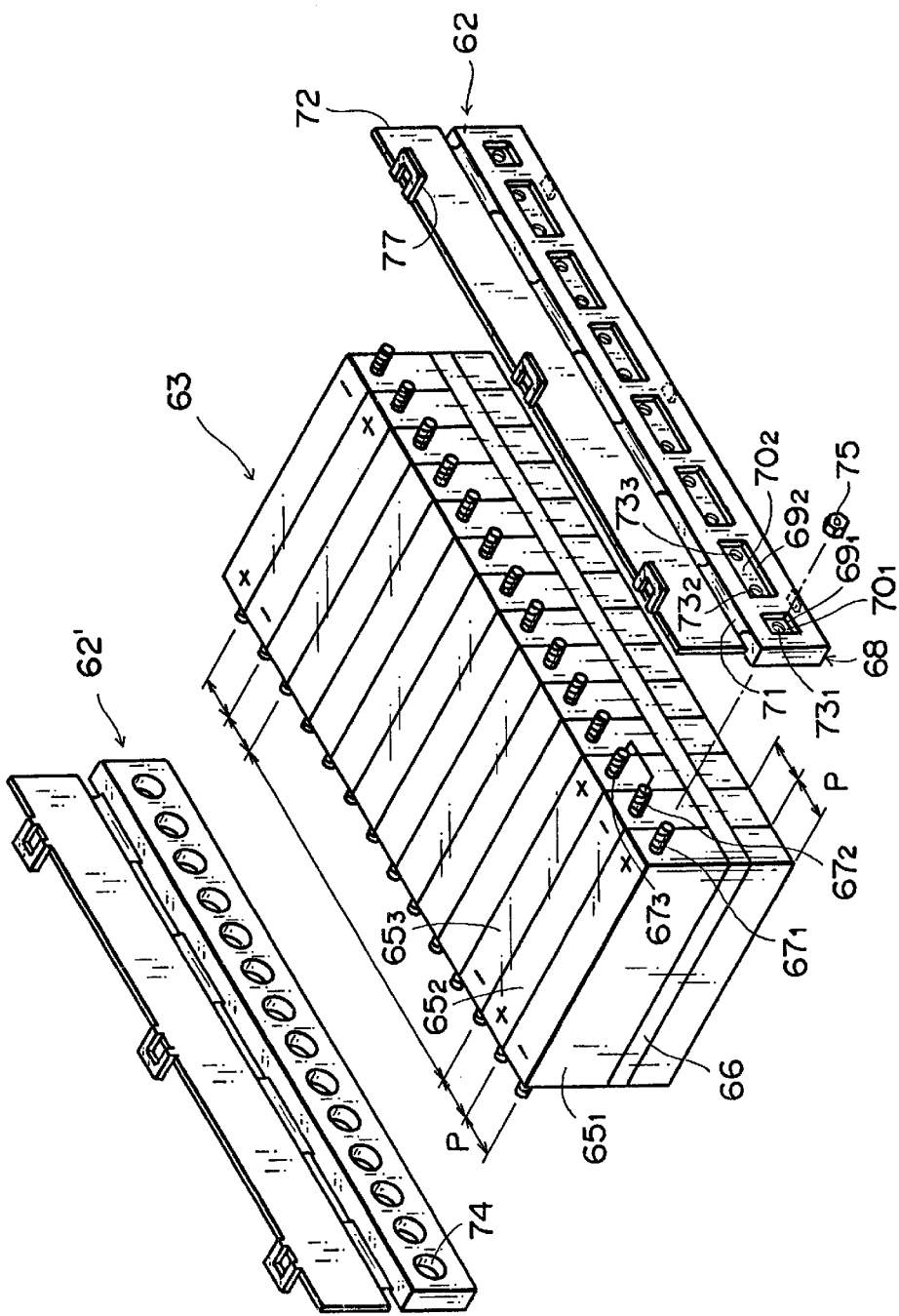
FIG. 6 is an exploded perspective view of a second example of a conventional unit assembling structure.
Figure 7:
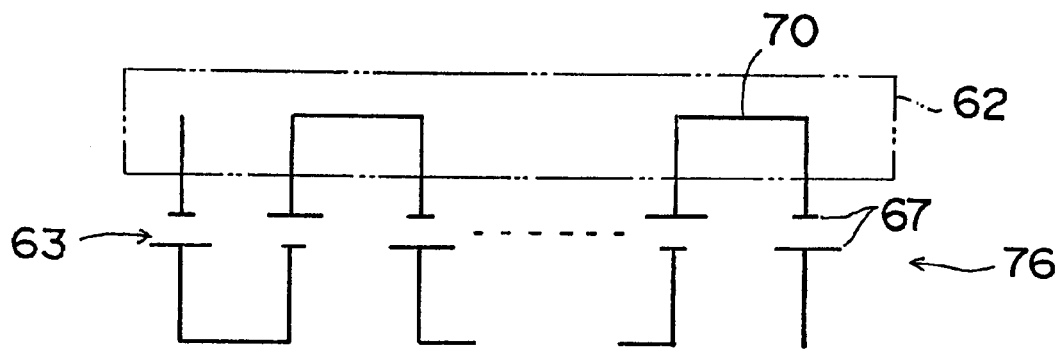
FIG. 7 is an explanatory view of a series circuit in the second example above.
Figure 8:
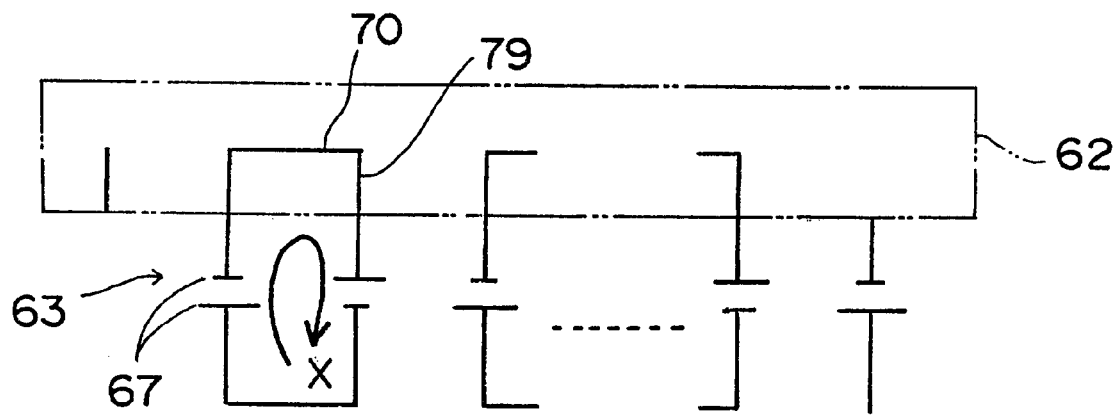
FIG. 8 is an explanatory view of a closed circuit formed at the time of a false assembly in the second example above.

In FIG. 2, the batteries next to the batteries 17 having the projections 34 on their one end surfaces 33 have like pairs of projections 34 on their not-shown other end surfaces so that the battery connection plate 1 (FIG. 1) is longitudinally positioned at the opposite ends of the battery assembly 6. If the electrode 15 at one end is positive, the electrode 15 at the other end is negative, and the projections 34 are, for example, provided at the positive electrode sides of the assembled batteries 17, making it possible to commonly use the batteries 17. The battery connection plate (not shown) assembled at the other end of the battery assembly 6, like the battery connection plate 62 in FIG. 6, carries one-hole busbars at longitudinally opposite ends thereof.

As shown in FIG. 4, the battery connection plate 1 is assembled to the battery assembly 6. The battery connection plate 1 is shown simplified as compared with that in FIG. 1. Concurrently with inserting the externally-threaded electrodes 15 of the batteries 17 into the insertion holes 16 of the busbars 10 carried on the plate body 2, the pairs of projections 34, 34 provided on every two batteries advance into and engage with the respective large frames 18 of the positioning section 3. Each busbar 10 has the two, left and right side insertion hole 16 and is locked in the respective busbar receiving portion 7 with the resilient claws 14.

During the assembly of the battery connection plate 1, if the electrode 15 is misaligned by one pitch and entering the neighbor insertion hole $16_1$ in the busbar 10, the pair of projections 34, 34 abut, at their tip ends 34a, against the opposite partition walls 20 of the small frame 19, thereby to hinder the assembly of the battery connection 1 to the battery assembly 6. An false assembling of the battery connection plate 1 is thus prevented, and no closed circuit is formed in the battery assembly 6 as in the described related art. The positive and negative electrodes 15, $15_1$ of two batteries 17, 171 are connected in series with one busbar 10, so as to constitute the battery assembly 6 of large voltage as a whole.

By the pair of projections 34, 34 engaging in the large frame 18 with substantially no clearance therebetween, there can be obtained an improved retention of the battery connection plate 1 on the battery assembly 6, making it possible to prevent rattling of the battery connection plate 1 due to vehicle vibrations, loosening of the nut (not shown) tightened on the electrode 15, and damages to the resin-made battery connection plate 1. Further, if an error is made in arranging the batteries 17 (for example, confusion of positive electrode 15 with negative electrode), because the tip ends 34a of the projections 34 abut against the partition walls 20 of the small frame 19, a false assembly of batteries 17 can be detected.

Since, at the time of assembling, electrodes 15 are inserted into the busbar insertion holes 16, if an assembling error of the battery connection plate 1 takes place, the positional deviation of the battery connection plate 1 will be at most as much as one pitch of the electrodes 15. Accordingly, it suffices that the projections 34 are provided with a minimum size needed to abut against the partition walls 20 of small frame 19 or with a substantially L-like intersecting shape as in the present embodiment. The projections 34 are thus made compact and lightweight, and a reduction is attained in the material cost and molding cost of the projections 34.

Since the minor walls 37 (FIG. 3) of the L-shaped projections 34 extend perpendicularly to the partition walls 20 of the small frame 19, the minor walls 37 are effective as an abutment member and serve to suppress horizontal and vertical and rotational rattling of the battery connection plate 1 on the battery assembly 6. Of course, the projections 34 may be replaced by one large rectangular block of such size as to correspond to the inner sizes $L_3$, $L_4$ of the large frame 18.

If the electrode 15 or externally threaded terminal of the battery 17 deviates radially from position due to a manufacturing error, runout or the like (positional deviation will be about 0.35 mm at the most), the resilient hinge 8 (FIG. 1) allows the related busbar receiving portion 7 to move slightly in the deviation direction to absorb the discrepancy on a busbar receiving portion basis and allow smooth insertion of the electrode 15 into the related insertion hole 16 of the busbar 10 (FIG. 4). In this instance, because the front wall 12 is divided at the large frames 18 by the slit 42 (FIG. 1) in the vicinity of the side walls 11 of the busbar receiving portions 7, the large and small frames 18, 19 contiguous to the moved busbar receiving portion 7 become slightly contorted in parallelogram, causing the partition wall 20 between the frames 18 and 19 to slightly bend slantingly.

The bending of the partition wall 20, however, is slight, and besides, the outer wall 22 of the frames 18, 19 does not move, it being longitudinally continuous and integral with the walls 12 of the busbar receiving portions $7_1$, 7 at both longitudinal ends, so that the large and small frames 18, 19 are stably kept in position or shape without substantial positional deviation. Thus, the compatibility with the projections 34 of the battery 17 is always maintained satisfactory, irrespective of the positional discrepancy absorbing action by the resilient hinge 8.

In FIG. 1, the battery connection plate 1 is provided, at one of its longitudinal ends, not with the large frame 18, but with an empty space 44 inside which, as shown in FIG. 4, the pair of projections 34, 34 are located on assembling the battery connection plate 1. Like this, the large frames 18 may be disused or the outer wall 22 at the large frames 18 may be cut out to provide only the small frames 19 at alternate positions. In this case, the locking projection 25, engageable with the cover 4 (FIG. 1.), is provided on the outer wall 22 at small frames 19.

Because there is provided a space 45 (FIG. 4) between the paired projections 34, 34, when assembling, the guide plate 30 (FIG. 1) at the rotation leading side of the cover 4 is situated between the paired projections 34, 34, without interfering with the projections 34, 34. Incidentally, it may be arranged that the projections 34, in case the battery connection plate 1 is falsely assembled, abut against the guide plate 30 (FIG. 1) of the cover 4 to detect the abnormality.

While the above example concerns the assembling error prevention structure for the battery connection plate (unit) 1 which is assembled to the battery assembly 6 of an electric vehicle, the same structure is also applicable to prevent an assembling error between a harness protector of synthetic resin and a device, apparatus or the like as in the described related art.

In this case, the battery assembly 6 in FIG. 4 corresponds to the mating unit such as a device, apparatus or the like, and the battery connection plate 1 to the harness protector (unit) which receives a wiring harness. Preferably, in place of the electrode 15 or bolt in FIG. 4, bevel locking clips (not shown) having a pair of resilient claws are provided on the harness protector, and engagement holes (not shown) for the locking clips are provided on a wall of the mating unit. Further, instead of providing the large and small frames 18, 19 on the unit and the projections 34 on the mating unit, it is also possible to provide the large and small frames on the mating unit and the projections on the unit.

Having now fully described the invention, it will be apparent to one of ordinary skill in the art that many changes and modifications can be made thereto without departing from the spirit and scope of the invention as set forth herein.

What is claimed is:

1. A unit assembling error prevention structure comprising:

a first unit;

a second unit;

a plurality of fixing means arranged at equal pitches, with which to assemble said first and second units together;

two types of positioning frames, large and small, provided in an alternate manner on one of said first and second units; and a projection means provided on the other of said first and second units, which is capable of advancing into said large positioning frame, but abuts against said small positioning frame;

wherein said first unit comprises a battery connection plate, said second unit comprises a battery assembly, and said plurality of fixing means comprises electrodes of batteries constituting said battery assembly, wherein said two types of positioning frames are provided on said battery connection plate, and wherein said projection means is provided on every two of said batteries.

2. The structure according to claim 1, wherein said projection means comprises a pair of projections capable of advancing at opposite sides in said large positioning frame.

3. The structure according to claim 2, wherein said pair of projection each comprises walls intersecting at right angles.

4. The structure according to claim 1, wherein said large positioning frame is removed leaving an empty space.

5. The structure according to claim 1, wherein said battery connection plate comprises a plurality of busbar receiving portions, and wherein said two types of positioning frames, large and small, are provided on each of said busbar receiving portions.

6. The structure according to claim 5, wherein said plurality of busbar receiving portions are linked with resilient hinges to be movable relative to each other, and said positioning frames provided on each said busbar receiving portion have a wall divided by a slit for each said positioning frames and a wall opposite said wall, which is continuous for two or more of said positioning frames.

* * * * *